United States Patent [19]
Hansen et al.

[11] Patent Number: 6,078,418
[45] Date of Patent: Jun. 20, 2000

[54] WAVELENGTH LOCKING OF VARIABLE DISPERSIVE ELEMENTS

[75] Inventors: Per Bang Hansen, Bradley Beach; Torben N. Nielsen, Monmouth Beach, both of N.J.

[73] Assignee: Lucent Technologies Inc., Murray Hill, N.J.

[21] Appl. No.: 08/909,978

[22] Filed: Aug. 12, 1997

[51] Int. Cl.[7] .......................... H04B 10/18; H04J 14/02
[52] U.S. Cl. ........................... 359/161; 359/130; 385/37
[58] Field of Search ..................... 359/127–130, 359/339, 177, 578–579, 589, 634, 637, 161; 385/37, 173

[56] References Cited

U.S. PATENT DOCUMENTS

| | | | |
|---|---|---|---|
| 5,673,129 | 9/1997 | mizrahi | 359/124 |
| 5,808,788 | 9/1998 | Park et al. | 359/337 |
| 5,915,052 | 6/1999 | Ball | 359/130 |
| 5,933,270 | 8/1999 | Toyohara | 359/179 |
| 5,963,361 | 10/1999 | Taylor et al. | 359/337 |
| 5,966,237 | 10/1999 | Sugaya et al. | 359/341 |

*Primary Examiner*—Leslie Pascal
*Attorney, Agent, or Firm*—John A. Caccuro

[57] ABSTRACT

A variable dispersion optical unit is used to vary the relative dispersion between an input signal and an output signal of the optical unit under control of a control circuit. The control unit uses an optical homodyne detector to beat the input optical signal with the output optical signal to generate a control signal to adjust the relative dispersion a variable dispersive element. The variable dispersive optical element may be selected from a group of dispersive elements including at least a Bragg grating, a Fabry-Perot filter, a Mach-Zehnder filter, and a waveguide routing element. The variable dispersive optical unit can be used as part of a variable wavelength selective optical circuit (e.g., a tunable wavelength filter) where the varying dispersion characteristics is used to control the selection of the wavelength of the tunable wavelength filter, or is used to select the drop/add wavelength(s) of an Add/Drop circuit.

28 Claims, 9 Drawing Sheets

WAVELENGTH LOCKING OF VARIABLE DISPERSIVE ELEMENTS

FIELD OF THE INVENTION

The invention relates to wavelength-division multiplexed (WDM) networks and, more particularly, to the wavelength locking of variable dispersive elements in a WDM network.

BACKGROUND OF THE INVENTION

The growth and diversity of lightwave networks is placing new demands on optical technology. In particularly, wavelength-division multiplexed (WDM) networks require new optical functions to enable capacity management and provisioning, maintenance, and reliable and robust operation. Obvious functions for WDM optical circuits include multiplexing and demultiplexing at terminal sites and noise filtering in amplified lightwave systems.

Recent WDM network proposals include Add/Drop optical circuits that enable extracting selected channels in a WDM stream and adding replacement channels positioned at the same wavelengths as the dropped channels. (For example, see the "Special Issue on Optical Communication Trends, proceedings of the IEEE, Volume 81, No. 11, November 1993.) The use of Add/Drop optical circuits avoids the electronic demultiplexing required to extract and inject local traffic channels of time-division-multiplexed optical signals. This also allows capacity growth by the creation of additional add/drop channels in the Add/Drop circuit. Add/Drop circuits can be implemented in various ways, including the use of integrated-optic wavelength routers and fiber Bragg grating filters.

Due to the required sharp amplitude transfer function, these filters also have high dispersion. It may be impossible to cascade such filters since the dispersion builds up linearly thereby decreasing the useful bandwidth of the filters. Therefore, it is a problem to manage dispersion in WDM networks employing wavelength selective devices.

SUMMARY OF THE INVENTION

We have solved the above problem by using a variable dispersive optical unit and by varying its dispersion to obtain the desired amount of output dispersion in the output signal. More particularly, our variable dispersion optical unit includes a variable dispersive optical element and a detection and control unit which compares the dispersion of an incoming optical signal with the dispersion of an output optical signal and generates a control signal to adjust the dispersion of the dispersion producing element to the desired value.

According to one aspect of the invention, the control unit uses an optical homodyne detector to beat the incoming optical signal with the output optical signal and generate a control signal to adjust the dispersion value of the variable dispersive element. The variable dispersive optical element may be selected from a group of dispersive elements including at least a Bragg grating, a Fabry-Perot filter, a Mach-Zehnder filter, and a waveguide routing element. An interface is used to adjust a variable dispersion characteristic of the dispersive element, the characteristic being selected from a group of characteristics including a length of, a temperature of, or a stress on the dispersive element.

The variable dispersive optical unit can be used as part of a variable wavelength selective optical circuit (e.g., a tunable wavelength filter) where the varying dispersion characteristics is used to control the selection of the wavelength of the tunable wavelength filter, or is used to select the drop/add wavelength(s) of an Add/Drop circuit.

DETAILED DESCRIPTION

In the following description, each item or block of each figure has a reference designation associated therewith, the first number of which refers to the figure in which that item is first located (e.g., 110 is located in FIG. 1).

Figure 9:
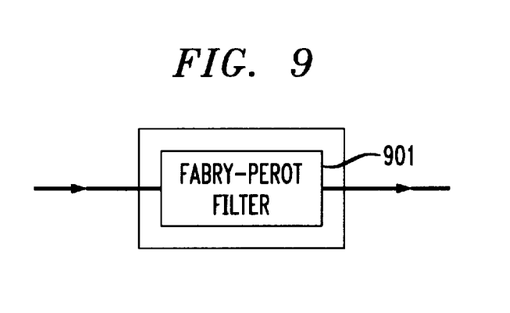
FIG. 9 shows a Fabry-Perot filter for use as the variable dispersive element of e.g., FIG. 4.
Figure 10:
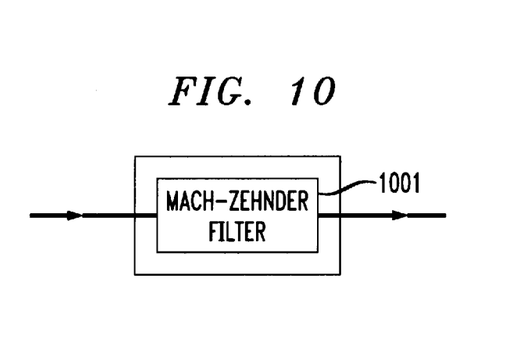
FIG. 10 shows a Mach-Zehnder filter for use as the variable dispersive element of e.g., FIG. 4.
Figure 11:
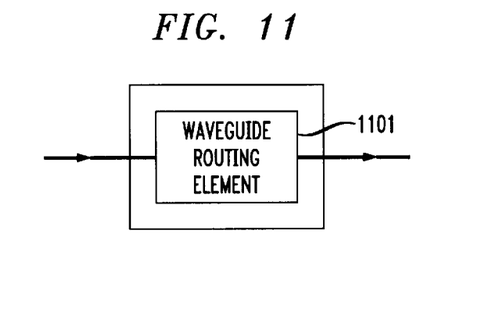
FIG. 11 shows a waveguide routing element for use as the variable dispersive element of e.g., FIG. 4.

As previously discussed, fiber Bragg gratings inherently have a sharp amplitude transfer function and high dispersion. As such, fiber Bragg gratings may be impossible to cascade since the dispersion builds up linearly thereby decreasing the useful bandwidth of the grating. While the dispersion problems may be most severe with fiber Bragg gratings, the dispersion problem is a general one which exhibits itself in a variety of dispersion producing elements such as Fabry-Perot filters (901 of FIG. 9), Mach-Zehnder filters (1001 of FIG. 10), or waveguide routing filters (1101 of FIG. 11). Therefore, it is a general problem to manage dispersion in networks employing such dispersion producing elements.

Figure 1:
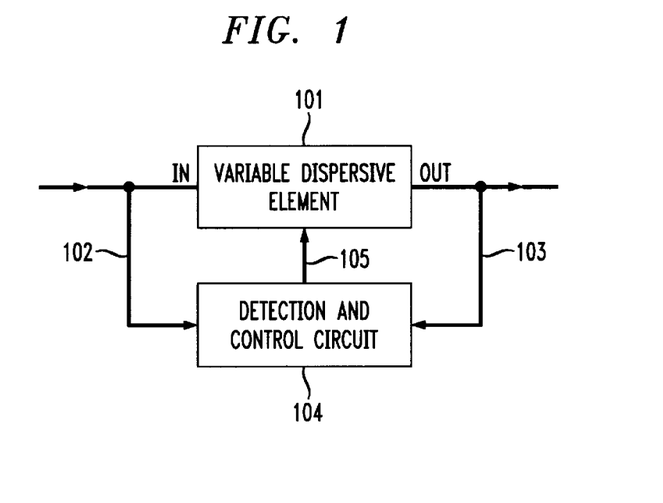
FIG. 1 shows an illustrative block diagram of a circuit for the wavelength locking of a variable dispersive element in accordance with the present invention.

With reference to FIG. 1 and in accordance with the present invention, we have solved the above problem by making the dispersion producing element variable 101 and by varying the dispersion to obtain the desired amount of dispersion experienced by the output signal 102. More particularly, our variable dispersion optical element includes a detection and control unit 104 which compares the incoming optical signal 102 with the dispersed output optical signal 103 and uses it to generate a control signal 105 to adjust the dispersion of the dispersion producing element With reference to, FIG. 2 there is shown a variable dispersive element 101 of FIG. 1 arranged as part of a Drop circuit 201. While the Drop circuit 201 is typically implemented as part of a Drop/Add circuit (described later), for simplification purposes we describe our invention initially as part of a Drop circuit 201. The Drop circuit 201 includes a directional coupler 203 for outputting (or dropping) the wavelength $\lambda_1$ from the input optical signal received at the input (IN) port.

Figure 7:
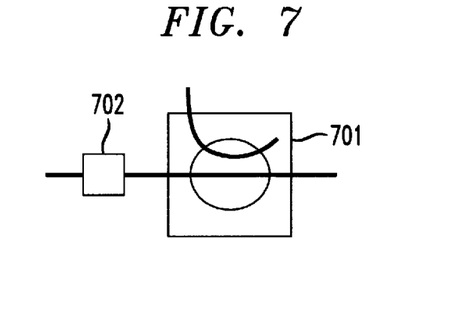
FIG. 7 shows a typical waveguide or fiber coupler for use as the coupler element of e.g., FIG. 4.
Figure 8:
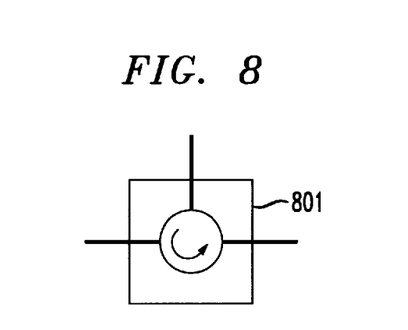
FIG. 8 shows a typical circulator for use as the coupler element of e.g., FIG. 4.

The directional coupler 203 (as well as the add circuit couplers of FIGS. 12 and 13) is preferably a circulator 801 as shown in FIG. 8 or may be a waveguide or fiber coupler 701 as shown in FIG. 7, used with or without the optional isolator 702. Alternatively, the directional coupler 203 may also be a beamsplitter 1401 as shown in FIG. 14.

Returning to FIG. 2, the Drop circuit 201 is illustratively implemented using a fiber Bragg grating 204, as the dispersive element 101, which reflects back the wavelength $\lambda_1$ through directional coupler 203 to the output (OUT) port of Drop circuit 201. The interface 202 is used to control the wavelength $\lambda_2$ variability of the fiber Bragg grating 204. It is known that the Bragg wavelength $\lambda_1$ of a fiber Bragg grating may be controlled by mechanical stress or temperature. Thus, interface 202 may include, illustratively, a piezo element to exert mechanical stress to fiber Bragg grating 204 or a heating element (e.g., a resistor) to control the temperature of the fiber Bragg grating 204. Interface 202 operates under control of a signal 205 generated by the detection and control circuit 104 (hereinafter referred to as control circuit 104). A Drop/Continue signal 206 applied via adder circuit 207 controls whether the fiber Bragg grating 204 transmits or reflects the wavelength $\lambda_1$.

Figure 2:
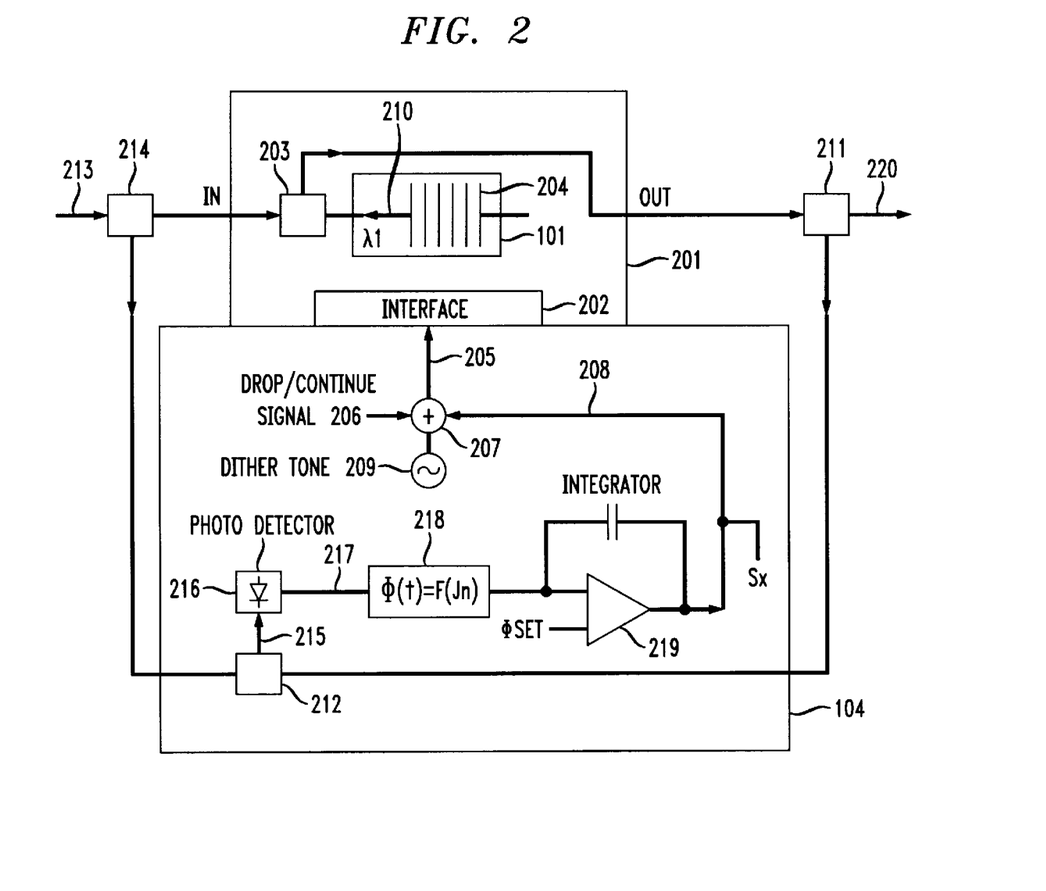
FIG. 2 shows an illustrative Drop circuit implemented using a directional coupler, a fiber Bragg grating as a variable dispersive element, and a detection and control circuit.

The fiber Bragg gratings are ideal for use in Drop circuit 201 applications as a result of their almost ideal amplitude transfer function. However, this feature of the gratings also introduces some problems.

Figure 3:
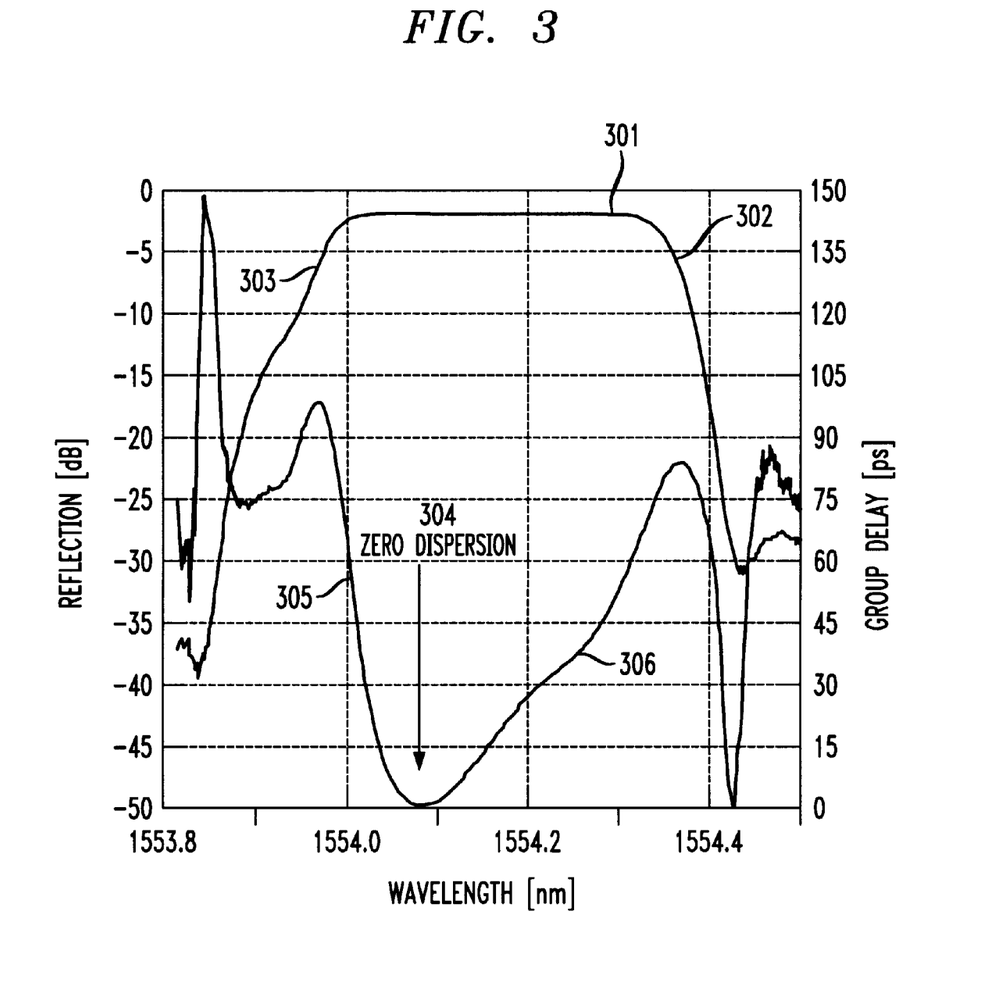
FIG. 3 shows an illustrative amplitude and group delay response of a fiber Bragg grating in the reflection mode.

First, it is difficult to ensure that Bragg gratings in the reflective mode are tuned so that the signal is centered in the middle of the reflection band. With reference to FIG. 3, there is shown an illustrative amplitude and group delay response of a fiber Bragg grating operating in the reflection mode. As shown, a fiber Bragg grating (also referred to hereinafter as a grating) has an almost perfect flat-top transfer function 301 which makes it difficult for any feedback loop based on power detection from being able to actively position a received signal wavelength at the center of the grating. This stems from the fact that the flat-top transfer function 301 essentially prevents any error signal from being generated for the feedback loop, except when the signal wavelength reaches the edges of the reflection band 302 or 303 of the grating. Additionally, with reference to FIG. 5, the gratings also have a flat amplitude response in the transmission mode (i.e., regions 501 and 502) making it equally difficult to ensure that the reflection band of the grating is tuned sufficiently far away from the signal wavelength.

A second problem is that fiber Bragg gratings have high dispersion in the reflection band as well as at the edges of the transmission band. This is illustrated in FIG. 3. which shows the measured amplitude and group delay response (the dispersion is the derivative of the group delay) of a grating in both reflection and transmission mode. As seen, the grating has high (both positive and negative) dispersion in the reflection band except at one particular zero dispersion wavelength 304. More particularly, in the reflection band the grating exhibits a very high negative dispersion at shorter wavelengths 305 just below the zero dispersion wavelength 304 and exhibits a high positive dispersion at longer wavelengths 306 just above the zero dispersion wavelength 304.

With reference again to FIG. 5, a grating tuned to the transmission region or mode also becomes highly dispersive as the signal wavelength approaches the edges 503 and 504 of the reflection band 509. In the transmission mode, the grating exhibits a high positive dispersion at shorter wavelengths 507 just below the reflection band and exhibits a high negative dispersion at longer wavelengths 508 just above the reflection band. However, if the grating is tuned far away from the reflection band, 505 or 506, the group delay becomes constant, i.e. the dispersion drops to zero.

It can readily be understood, that when such Drop nodes (or Add nodes or Add/Drop nodes) are cascaded, the dispersion builds up linearly thereby decreasing the useful bandwidth of the grating. Dispersion management in the network—which otherwise would be employed to minimize, e.g., nonlinear effects—would become very difficult because the dispersion changes more or less randomly as the optical signals encounters a grating.

In accordance with the present invention, we have solved the previously outlined amplitude as well as dispersion problems when using the gratings. Our idea is to use the inherent dispersion characteristics of the gratings as a measure of the incoming optical signals position relative to the wavelength characteristics of the grating, and to actively lock the gratings to a fixed dispersion using active feedback to align the grating to the incoming optical signal. The proposed method is based on the unique dispersion characteristic of the grating, which allows the grating to be locked to the incoming optical signal so that a predetermined (zero is one example) amount of dispersion is introduced. This would not only pinpoint the amount of dispersion introduced by the grating, but it would also ensure that the wavelength of the incoming optical signal doesn't approach the filter edges. Moreover, it enables the adjustment and locking of the wavelength of the gratings to the exact incoming optical signal wavelength where the dispersion is minimum. Our invention provides two desirable features:

1) The gratings could be tuned to have a desired amount of dispersion. Zero dispersion is one example, but dispersion different from zero could also be achieved and may even be desirable for some applications.

2) The dispersion is a measure of the position of the wavelength signal relative to the reflection band or transmission band of the grating. Locking the grating to a fixed dispersion will therefore automatically position the reflection band of the grating relative to the signal wavelength. The grating can therefore be locked to any position in the reflection band or any position in the transmission band despite the flat amplitude characteristics of the fiber grating in those bands.

Our invention may be used, for example, to lock a grating(s) to the wavelength channel(s) to be dropped at a Drop/Add node or may be used to lock a grating(s) to the transmission or continue channel(s) of a Drop/Add node. While the circuit arrangements utilized are very similar and use the same components, for clarity of operation they will be described separately.

Returning to FIG. 2, we describe how the grating 204 corresponding to wavelength $\lambda_1$ is locked in the reflective mode. A small dither signal 209 (e.g., at a frequency $f_d$ of 1 kHz or less) is added to the drop/continue control signal 206 for the grating 204. This dither signal 209 results in a modulation of the group delay of the grating 204 around the bias point (e.g., 304 of FIG. 3) which is set by the control signal 206 and signal $S_x$ (which will be described later). The resulting group delay modulation will impose a phase modulation, $\phi(t)$, of the reflected signal 210 from grating 204. The magnitude and phase of the phase modulation is proportional to the dispersion at the bias point. In particular, the phase modulation will be zero if the signal wavelength coincides with the zero dispersion wavelength (e.g., 304 of FIG. 3) of the grating 204.

The phase-modulated reflected signal 210 is reflected via directional coupler 203 to the output (OUT) of the drop port 201 A coupler (or splitter) 211 both outputs this signal over line 220 and couples a portion of this signal to combiner 212 where it is combined with the incoming optical signal 213 obtained from coupler (or splitter) 214. This combined signal 215, is demodulated using homodyne demodulation in a low speed photo detector 216.

Homodyne demodulation occurs in photo detector 216 by beating a small portion of the reflected optical signal 210 with a small portion of the incoming optical signal 213. This homodyne demodulation produces an electrical signal 217, which has a number of modulation sidebands, i.e. frequency components at multiples of the dither frequency $f_d$. The magnitude and phase of these frequency components depends on the magnitude of the induced phase modulation, i.e. where the reflected signal is located relative to the grating. The magnitude and phase of the Nth harmonic frequency component is proportional to $J_N(\phi)$ where $J_N$ is the Nth order Bessel function. The phase modulation index can be found in a well known manner using firmware or software which calculates the phase modulation index from the magnitude and phase of a subset of the modulation side bands. In one implementation, a DSP 218 is used, although other implementations using simple narrow band filters and analog multipliers are also possible.

The calculated phase modulation index (being proportional to the dispersion at the operating point) is subsequently compared in integrator 219 to the desired value, $\phi_{SET}$, and the resulting error signal is integrated to form the signal $S_X$. The resulting signal $S_X$ is fed back to interface 202 which then adjusts the wavelength of the grating 204 thereby closing the feedback loop.

Figure 13:
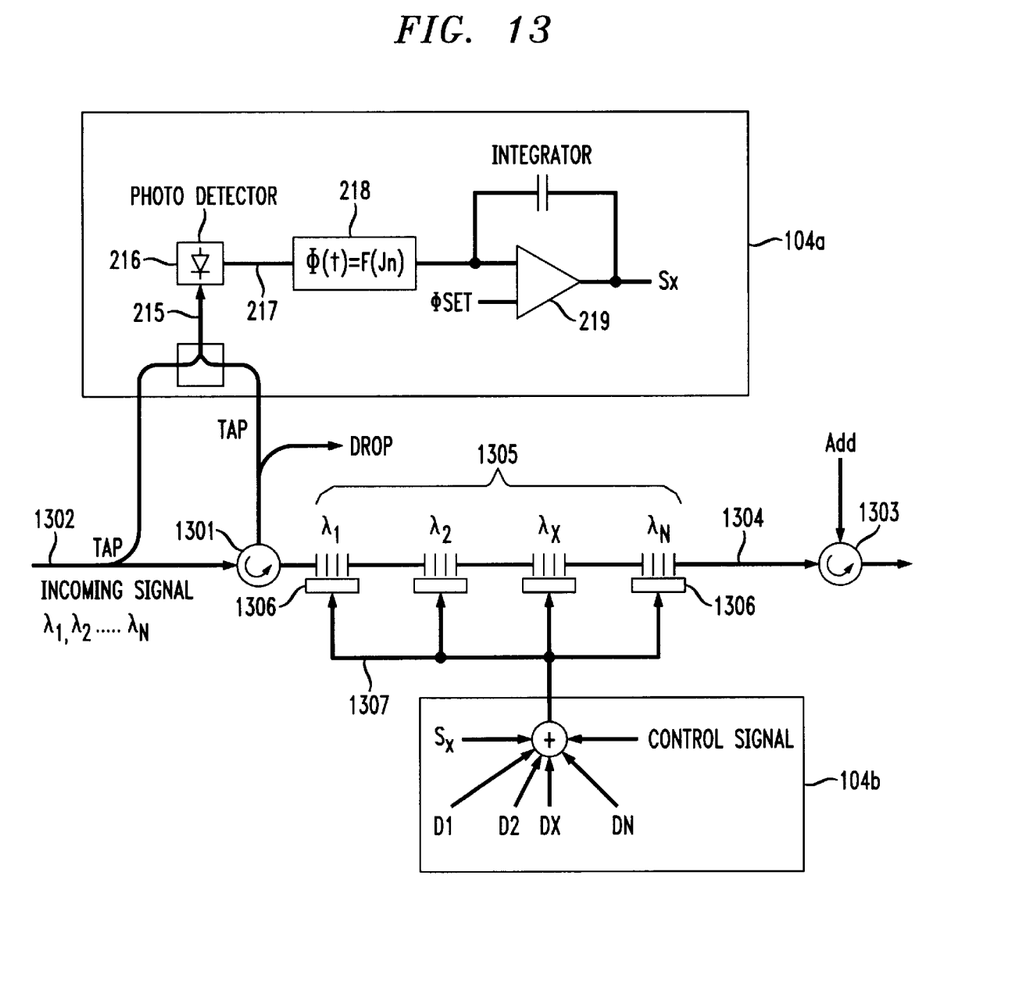
FIG. 13 shows an illustrative multiple wavelength Add/Drop circuit where each of the gratings are locked to the reflection or dropped wavelengths mode.
Figure 14:
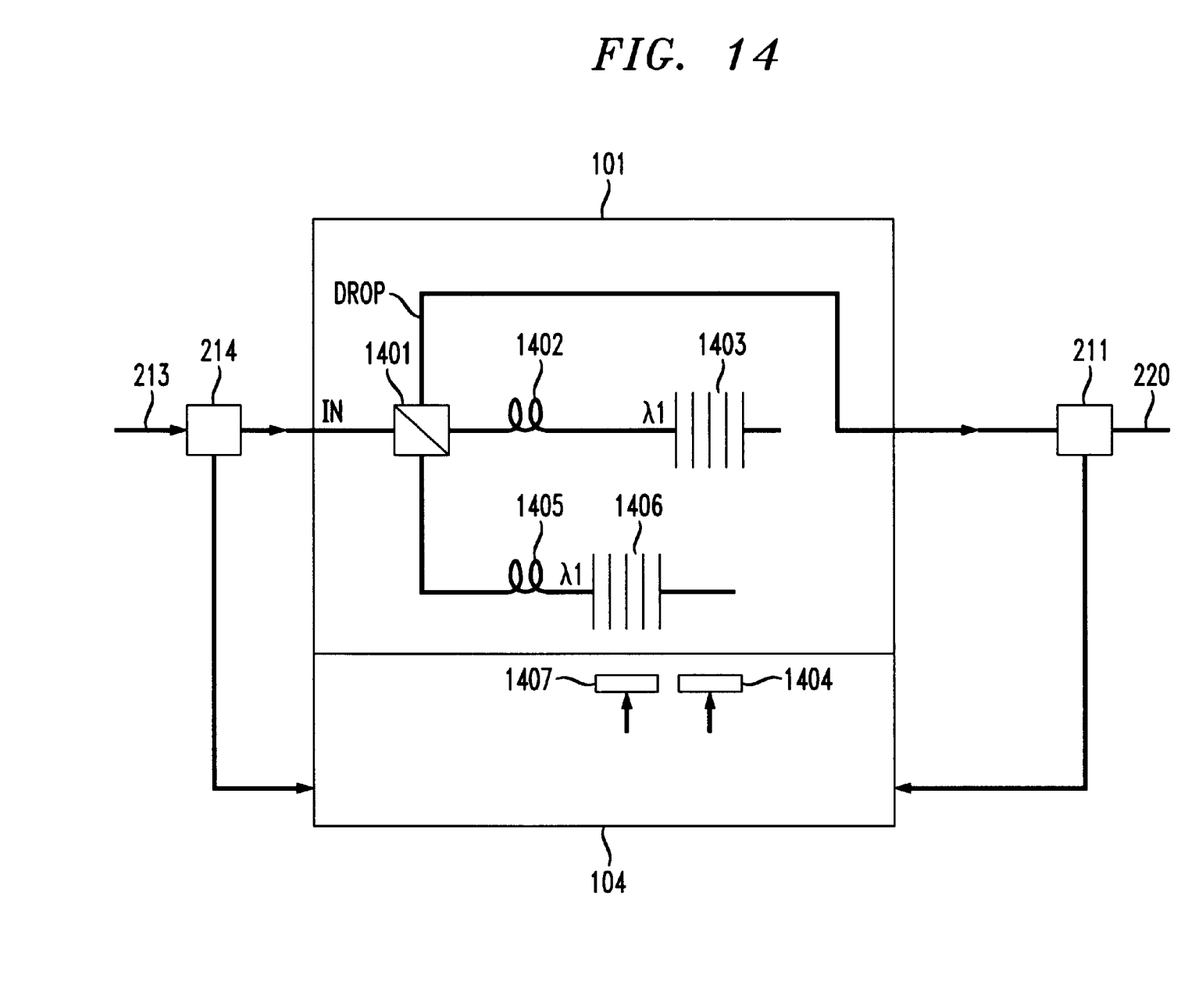
FIG. 14 shows an illustrative Drop circuit of FIG. 4 where beamsplitters are used as the coupler element.

With reference to FIG. 13, there is shown an illustrative multiple wavelength Add/Drop node where each of the gratings are locked to the reflection mode to drop the desired wavelengths. The tunable Add/Drop node of FIG. 13 may be used, for example, in re-configurable WDM networks. Such an Add/Drop node would most likely be based on fiber Bragg gratings as previously described in FIG. 2.

The Add/Drop Node of FIG. 13, includes the following units:

1) An optical circulator 1301 which serves as a drop port from which selected wavelengths are dropped from the incoming signal 1302.
2) An optical circulator 1303 which serves as an add (or continue) port from which selected wavelengths are added to the through signal 1304.
3) A series of fiber Bragg gratings 1305 with fiber Bragg wavelengths corresponding to the wavelengths in the network $\lambda_1 \ldots \lambda_N$. Each grating is placed on an interface 1306 including a heating element (or a piezo element) which allows the Bragg wavelength of each grating to be tuned (within a limited range) by applying a control signal 1307 to the heating/piezo element.
4) A control circuit 104 (104a and 104b) that measures the wavelength of the incoming signal wavelengths (also referred to as channels) $\lambda_1 \ldots \lambda_N$. The control circuit 104 generates and applies the appropriate control signal 1307 to each individual grating, depending on whether the corresponding wavelength should be dropped at port 1301 or passed to the add or continue port 1303.

In one illustrative network arrangement, the separation, or guard band, between the wavelengths may be 100 GHz. The Bragg wavelength of the fiber Bragg gratings are also separated by a 100 GHz guard-band. Each incoming channel can be routed to the Drop port or Continue port depending on the control signal 1307 applied to the corresponding grating. Passing a signal wavelength $\lambda_x$ to the continue port 1303 is accomplished by tuning the grating 1305 into an adjacent guard-band, away from the incoming signal wavelength $\lambda_x$. If the grating 1305 is tuned to coincide with incoming signal wavelength $\lambda_x$, the wavelength would be reflected to the Drop port 1301.

Figure 5:
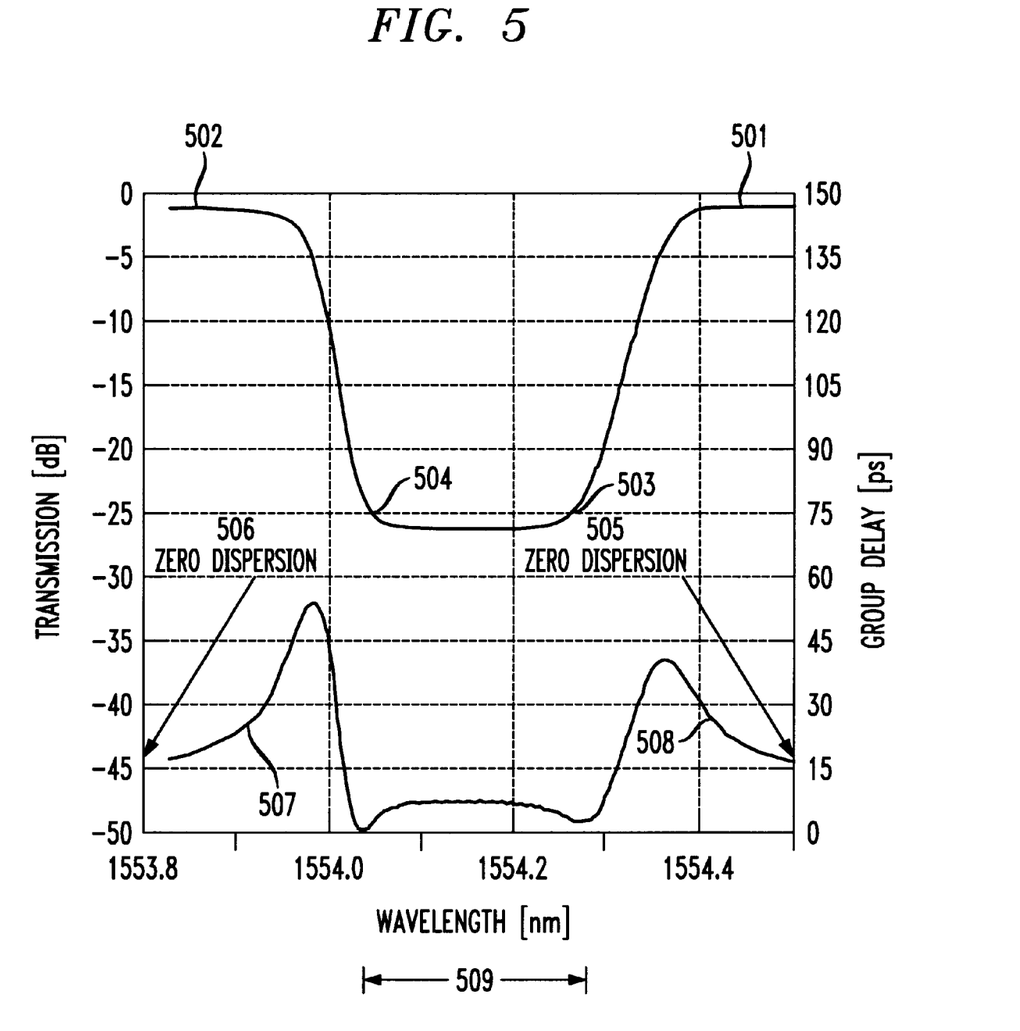
FIG. 5 shows an illustrative amplitude and group delay response of a fiber Bragg grating in the transmission mode.

In the continue mode, the grating is tuned to a wavelength between the signal wavelength $\lambda_x$ and the wavelength of a neighbor channel, i.e. each grating needs a tuning range of only half the channel spacing. While the tuning range of the gratings is fairly limited it can readily accommodate half of the 100 GHz channel spacing. Since the Add/Drop configuration uses the 100 GHz guard-band between neighbor channels, the bandwidth of the gratings 1305 must accordingly be lower than 100 GHz in order to fit into the guard band. The bandwidth of the gratings will, typically, be on the order of 50 GHz. As shown in FIGS. 3 and 5, fiber Bragg grating are ideal for this application since they can be fabricated with an almost square filter shape with a narrow and very flat reflection band and very steep filter edges.

According to another aspect of our invention, to lock more than one grating, different dither frequencies D1, D2 . . . DN, can be used for each grating. Alternatively, as in FIG. 12, the gratings can be controlled one by one using a selector switch circuit 1220. This is possible since the bandwidth in the feedback loop can be very low.

Figure 4:
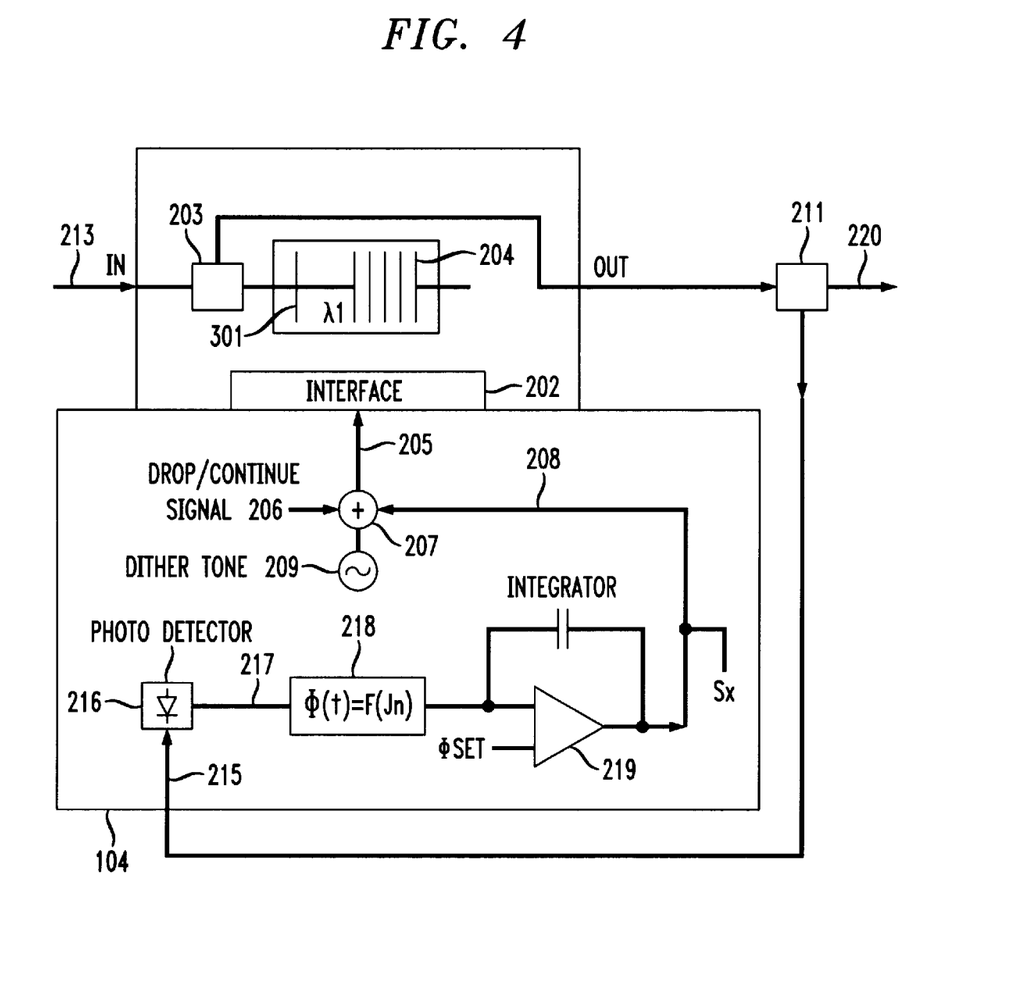
FIG. 4 shows another type of Drop circuit implemented using a coupler, a fiber Bragg grating, a broad band reflector and a detection and control circuit.

With reference to FIG. 4, there is shown an illustrative one wavelength ($\lambda_1$) Drop circuit implemented using a directional coupler 203 for outputting the dropped wavelength $\lambda_1$, a fiber Bragg grating 204 for reflecting the dropped wavelength $\lambda_1$, a broad band reflector 301 for reflecting a small amount of the incoming signal 213 and a detection and control circuit 104. Both the dropped wavelength $\lambda_1$ and the small amount of incoming signal 213 exit directional coupler 203 and output (OUT) port to coupler 211. The coupler 211 outputs both the dropped wavelength $\lambda_1$ and the small amount of incoming signal 213 to fiber 220 and to the input to photo detector 216.

Note since both the dropped wavelength $\lambda_1$ and the small amount of incoming signal 213 are provided from coupler 211, this arrangement eliminates the need for coupler 214 to provide the incoming signal 213 to photo detector 216. However, the small amount of the incoming signal which is also outputted at the drop port 403 may be undesirable in particular applications. The remaining operational description of detection and control circuit 104 and FIG. 4 is the same as that previously described for FIG. 2.

Figure 6:
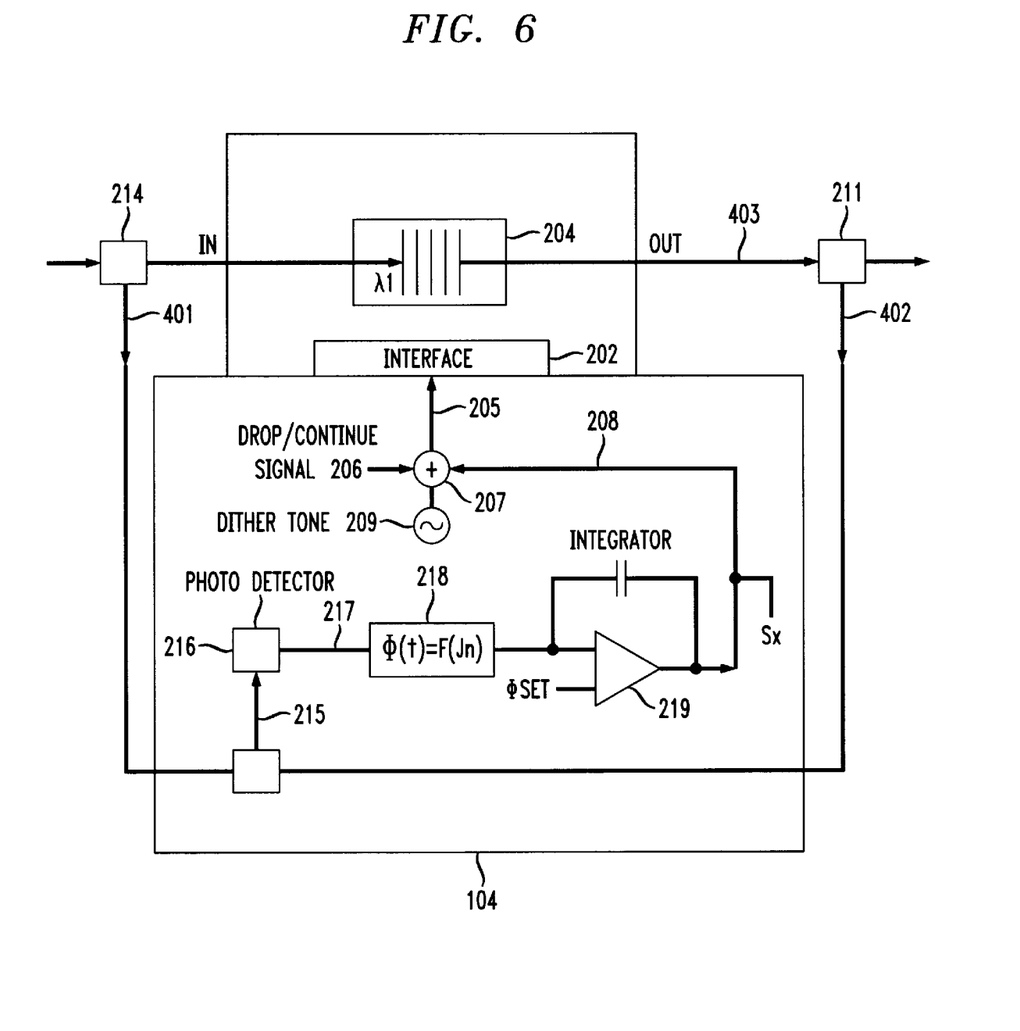
FIG. 6 shows an illustrative wavelength transmission dispersion control circuit implemented using a fiber Bragg grating and a detection and control circuit.

With reference to FIG. 6, we describe the operation of our invention when used in an illustrative wavelength transmission dispersion control circuit implemented using a fiber Bragg grating 204 and detection and control circuit 104. The configuration is used to lock the Bragg grating 204 in the transmit mode and uses the same principle as described, in FIG. 2, for the drop mode. In the FIG. 6 arrangement, however, photo detector 216 beats the incoming signal 401 with the continue signal 402 transmitted through grating 204, rather than beating the input signal and the dropped signal as is done in FIG. 2. In FIG. 6, the desired dispersion value for the continue signal 402 is set using the $\phi_{SET}$ value inputted to integrator 219 and the resulting error signal is integrated to form the signal $S_X$. The resulting signal $S_X$ is fed back to interface 202 which then adjusts the wavelength of the grating 204 thereby closing the feedback loop and establishing the desired dispersion value of the grating 204.

Figure 12:
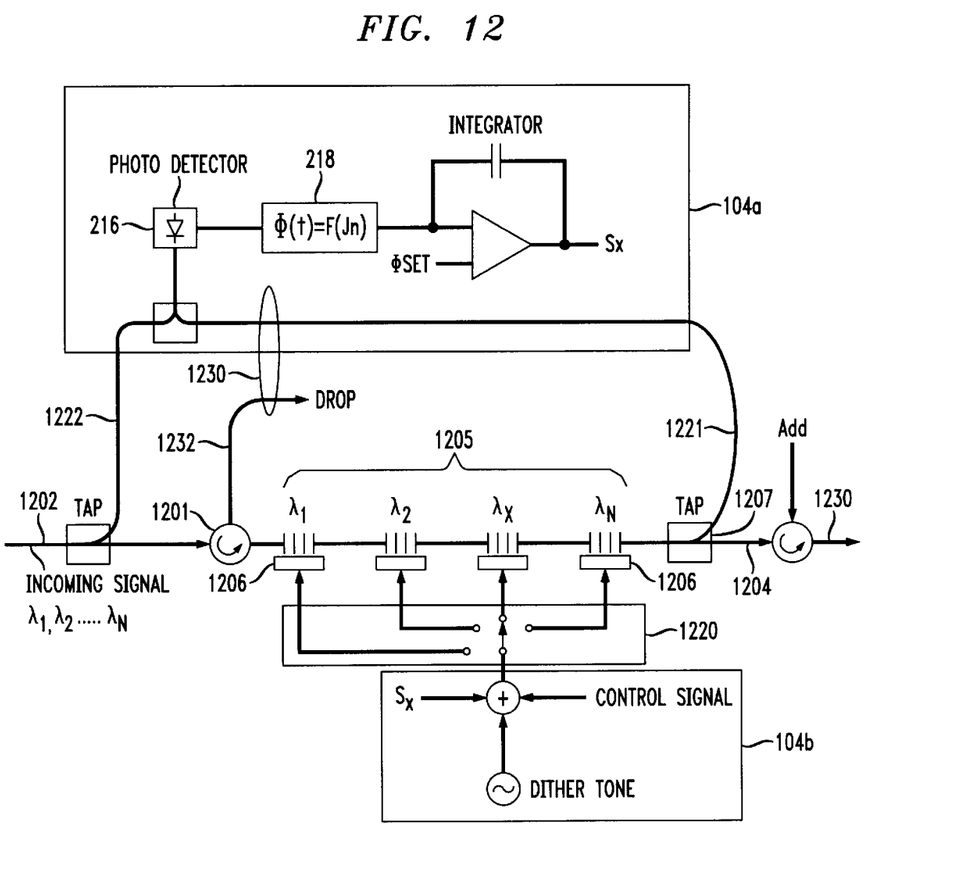
FIG. 12 shows an illustrative multiple wavelength Add/Drop circuit where each of the gratings are locked to the transmission mode using a switched control circuit.

FIG. 12 shows an illustrative multiple wavelength Add/Drop circuit where each of the reflection bands of gratings 1205 are individually set and locked in the transmission mode using a switched control circuit 1220. Such an arrangement would be used, for example, when it is more desirable to control the dispersion of the incoming signal wavelengths 1202 that are not to be dropped, but rather are to be transmitted through the Add/Drop node to fiber 1230. The detection and control 104 (including units 104a and 104b) operates in essentially the same manner as previously discussed in FIG. 2. The detection and control circuit 104a and 104b acting through switched control circuit 1220 and the appropriate interface 1206 is able to selectively control each the gratings 1205.

It should be noted, that the tap signal 1221 from the continue port 1207 and the drop signal 1232 from circulator 1201 could be combined in a fiber coupler 1230 prior to being combined with the input signal 1222. In such an arrangement, the same setup could be used to monitor and control any combination of drop/continue wavelength channels of the incoming wavelength signal channels $\lambda_1 \ldots \lambda_N$.

FIG. 14 shows an illustrative Drop circuit of FIG. 4 where a beamsplitter is used as the coupler element. Such an arrangement is useful for receiving an unpolarized incoming wavelength signal 213, as described in the patent application entitled "Add/Drop circuit for a Wavelength-Division Multiplexed network", Ser. No. 08/730,282, filed on Oct. 15, 1996 by R. C. Giles et al.

In the arrangement of FIG. 14, the variable dispersive element 101 includes a beamsplitter 1401 having an input port for receiving the unpolarized incoming wavelength signal from coupler 214, a drop port for outputting the dropped wavelength $\lambda_1$ signal to coupler 211, a transmission port for outputting a first polarization signal, and a reflection port for outputting a second polarized signal. The transmission port connects to a 45 degree polarization controller (PC) 1402 and grating 1403. The reflection port connects to a 45 degree polarization controller 1405 and grating 1406. Each of the PCs 1402 and 1405 rotate each pass of the signal by 45 degrees. Thus, the transmission port signal (including the wavelength $\lambda_1$ signal) is rotated 45 degrees in PC 1402, the wavelength $\lambda_1$ signal is reflected by grating 1403, the reflected wavelength $\lambda_1$ signal is also rotated 45 degrees in PC 1402, and since the wavelength $\lambda_1$ signal has been rotated 90 degrees it is reflected out at the drop port. Similarly, the transmission port signal (including the wavelength $\lambda_1$ signal) is rotated 45 degrees in PC 1405, the wavelength $\lambda_1$ signal is reflected by grating 1406, the reflected wavelength $\lambda_1$ signal is rotated 45 degrees in PC 1405, and since the wavelength $\lambda_1$ signal has been rotated 90 degrees it is transmitted through the beamsplitter 1401 to the drop port. The interfaces 1404 and 1407 are used to adjust the reflection band of the gratings 1403 and 1406, respectively. The interfaces 1404 and 1407 are individually controlled by detection and control circuit 104 in the same manner as described in FIG. 12.

If desired, the FIG. 14 arrangement can be made to drop more than one wavelength by adding more gratings and interfaces. Additionally, if desired the FIG. 14 arrangement can be made to transmit one or more wavelengths by connecting the grating(s) in the manner as shown in FIGS. 4 and 12. Moreover, the FIG. 14 arrangement can be arranged as an Add/Drop node in a manner similar to that shown in FIG. 12.

According to another aspect of the present invention, with reference to FIG. 12, the setup could also be used to monitor the optical power of each wavelength channel $\lambda_1 \ldots \lambda_N$ provided that the gratings 1205 are locked to a dispersion value different from zero. This is accomplished by measuring the mean square photo current at the output of the low speed photo detector 216 which is given by the expression $$<1_N^2> = 2 \cdot R^2 \cdot P_X^2 \cdot \eta_1 \eta_2 \cdot J_N^2 (\phi_{SET})$$

where index N indicates the Nth modulation sideband, $P_X$ is the optical power of wavelength channel X, and R is the responsivity of the low speed photo detector. And where $\eta_1$ is the optical loss from the input port to the low speed photo detector 216 for the signal being tapped from the input port and $\eta_2$ is the optical loss from the input port to the low speed photo detector 216 for the signal being reflected from the grating (if the grating is tuned to reflective mode) or the signal tapped from the continue port (if the grating is tuned to the transmit mode).

All the optical losses, the responsively and $\phi_{SET}$ are known (if the grating is locked). The optical power in wavelength channel x, i.e., $P_X$, can therefore be found by measuring the mean square photo current at the Nth modulation sideband (for example the sideband with the highest power) and solving the above equation. The above calculations can be programmed into the DSP 218.

What has been described is merely illustrative of the application of the principles of the present invention. Other arrangements and methods can be implemented by those skilled in the art without departing from the spirit and scope of the present invention.

We claim:

1. A variable dispersion optical unit comprising
   a variable dispersive element for changing the relative dispersion between an input optical signal thereto and an output optical therefrom in response to a control signal, and
   control circuit for comparing the dispersion of a phase of the input optical signal and a phase of the output optical signal using coherent detection and in response thereto generating the control signal to adjust the relative dispersion of the output optical signal to within a predetermined value of the dispersion of the input optical signal.

2. The variable dispersion optical unit of claim 1 wherein the control circuit includes an optical homodyne detector for generating the control signal.

3. The variable dispersion optical unit of claim 1 wherein the variable dispersive element includes a dispersive element and interface for adjusting a characteristic of the dispersive element in response to the control signal so as to cause a change in the dispersion of the output optical signal.

4. The variable dispersion optical unit of claim 1 wherein the variable dispersive element is selected from a group of dispersive elements including at least a Bragg grating, a Fabry-Perot filter, a Mach-Zehnder filter, and a waveguide routing element.

5. The variable dispersion optical unit of claim 1 wherein an interface adjusts a characteristic of the dispersive element, the characteristic being selected from a group of characteristics including a length of, a temperature of, or a stress on the dispersive element.

6. The variable dispersion optical unit of claim 1 wherein the variable dispersive element includes a reflective optical signal band and one or more transmissive optical signal bands, wherein the dispersion of the variable dispersive element varies as a function of the wavelength in those bands, and wherein the input optical signal falls within one of those bands.

7. The variable dispersion optical unit of claim 6 being part of a wavelength selective optical circuit comprising an optical circuit including a first port, a second port, and a third port, the first port for receiving an optical signal, the second port for outputting the received optical signal and for receiving at least a selected wavelength band of the received optical signal, and the third port for outputting said at least a selected wavelength band of the received optical signal, wherein the variable dispersive element functions as a variable wavelength selective element having a port connected to the second port of the optical circuit, the variable wavelength selective element selecting a wavelength band from the received optical signal from the second port of the optical circuit and reflecting the selected wavelength band back to the second port of the optical circuit.

an adjusting means for adjusting the selected wavelength band of the variable wavelength selective element in response to a control signal, and wherein the control circuit compares the selected wavelength band of the variable wavelength selective element with an identified wavelength band of the optical signal and in response thereto generates the control signal to adjust the selected wavelength band of the variable wavelength selective element within a predetermined range of the identified wavelength band of the optical signal.

8. The wavelength selective optical circuit of claim 7 wherein the optical circuit is selected from a group including at least a circulator, a fiber coupler, a waveguide coupler, or a beamsplitter.

9. The variable dispersion optical unit of claim 1 wherein the control circuit is used to monitor input optical signal power.

10. A variable wavelength selective optical circuit comprising a wavelength selective element for selecting a wavelength band from an input optical signal, interface means for adjusting the selected wavelength band of the wavelength selective element in response to a control signal, and a control circuit for comparing a first optical signal of the selected wavelength band of the wavelength selective element with an identified wavelength band of the inputted optical signal and for detecting a phase difference between the first optical signal and the inputted optical signal using coherent detection and in response thereto generating the control signal to adjust the selected wavelength band of the wavelength selective element within a predetermined range of the identified wavelength band of the inputted optical signal.

11. The variable wavelength selective optical circuit of claim 10 wherein the wavelength selective element is selected from a group of elements including at least a Bragg grating, a Fabry-Perot filter, a Mach-Zehnder filter, and a waveguide routing element.

12. The variable wavelength selective optical circuit of claim 10 wherein the control circuit includes an optical homodyne detector for generating the control signal.

13. The variable wavelength selective optical circuit of claim 10 wherein the interface means adjusts a characteristic of the wavelength selective element, the characteristic being selected from a group of characteristics including a length of, a temperature of, or a stress on the wavelength selective element.

14. An Add/Drop circuit for use with an optical wavelength-division multiplexed signal comprising a first optical circuit including input, drop and continue ports, the input port for receiving an optical wavelength-division multiplexed signal, the drop port for outputting a wavelength band to be dropped from the received optical wavelength-division multiplexed signal, and the continue port for outputting the received optical signal, a variable wavelength selective element for selecting the wavelength band to be dropped from the received optical signal, the variable wavelength selective element having a first port and a second port, the first port connected to the continue port of the first optical circuit, the second port outputting the received optical signal minus the dropped wavelength band, a second optical circuit for forming a combined signal including an added wavelength band and the received optical signal minus the dropped wavelength band, second optical circuit including input, add and output ports, the input port for receiving the received optical signal minus the dropped wavelength band, the add port for receiving the added wavelength band and the output port for outputting the combined signal, an interface means for adjusting the dropped wavelength band of the variable wavelength selective element in response to a control signal, and a control circuit for comparing the dropped wavelength band of the variable wavelength selective element with an identified wavelength band of the inputted optical signal and in response thereto generating said control signal to adjust the dropped wavelength band of the variable wavelength selective element within a predetermined range of the identified wavelength band of the inputted optical signal.

15. The Add/Drop circuit of claim 14 wherein the variable wavelength selective element is selected from a group of elements including at least a Bragg grating, a Fabry-Perot filter, a Mach-Zehnder filter, and a waveguide routing element.

16. The Add/Drop circuit of claim 14 wherein the control circuit includes an optical homodyne detector for generating the control signal.

17. The Add/Drop circuit of claim 14 wherein the interface means adjusts a characteristic of the variable wavelength selective element, the characteristic being selected from a group of characteristics including a length of, a temperature of, or a stress on the wavelength selective element.

18. The Add/Drop circuit of claim 14 wherein the optical circuit is selected from a group including at least a circulator, a fiber coupler, a waveguide coupler, or a beamsplitter.

19. The Add/Drop circuit of claim 14 wherein the variable wavelength selective element reflects a portion of the input optical signal to the first optical circuit and wherein the control circuit uses the reflected portion of the input optical signal as the input optical signal.

20. A wavelength selective optical circuit comprising an optical circuit including a first port, a second port, and a third port, the first port for receiving an optical signal, the second port for outputting the received optical signal and for receiving at least a selected wavelength band of the received optical signal, and the third port for outputting said at least a selected wavelength band of the received optical signal, a variable wavelength selective element having a port connected to the second port of the optical circuit, the variable wavelength selective element selecting a wavelength band from the received optical signal from the second port of the optical circuit and reflecting the selected wavelength band back to the second port of the optical circuit, an interface means for adjusting the selected wavelength band of the variable wavelength selective element in response to a control signal, and a control circuit for comparing a first optical signal of the selected wavelength band reflected from the variable wavelength selective element with an identified wavelength band of the received optical signal and for detecting a phase difference between the first optical signal and the received optical signal using coherent detection and in response thereto generating the control signal to adjust the selected wavelength band of the variable wavelength selective element within a predetermined range of the identified wavelength band of the received optical signal.

21. The wavelength selective optical circuit of claim 20 arranged as a Drop circuit wherein the optical signal is received at the first port of the optical circuit and includes a plurality of wavelength bands, wherein the selected wavelength is a wavelength to be dropped from the optical signal at the third port of the optical circuit, and wherein the optical signal minus the dropped signal is outputted from a second port of the variable wavelength selective element.

22. The wavelength selective optical circuit of claim 20 arranged as an Add circuit wherein the optical signal received at the first port of the optical circuit is the selected wavelength band, wherein the selected wavelength band is received and reflected from the port of the variable wavelength selective element, and the selected wavelength band and at least one other wavelength band received from the port of the variable wavelength selective element are combined and outputted at the third port of the optical circuit.

23. The wavelength selective optical circuit of claim 20 wherein the variable wavelength selective element is selected from a group of elements including at least a Bragg grating, a Fabry-Perot filter, a Mach-Zehnder filter, and a waveguide routing element.

24. The wavelength selective optical circuit of claim 20 wherein the control circuit includes an optical homodyne detector for generating the control signal.

25. The wavelength selective optical circuit of claim 20 wherein the interface means adjusts a characteristic of the variable wavelength selective element, the characteristic being selected from a group of characteristics including a length of, a temperature of, or a stress on the wavelength selective element.

26. The wavelength selective optical circuit of claim 20 wherein the optical circuit is selected from a group including at least a circulator, a fiber coupler, a waveguide coupler, or a beamsplitter.

27. A wavelength selective optical circuit comprising an optical circuit including a first port, a second port, and a third port, the first port for receiving an input optical signal, the second port for outputting the received optical signal, and the third port for outputting said at least a selected wavelength band of the received optical signal, a variable wavelength selective element having a port connected to the second port of the optical circuit, the variable wavelength selective element selecting a wavelength band of the received optical signal from the second port of the optical circuit for passage through the variable wavelength selective element, an interface means for adjusting the selected wavelength band of the variable wavelength selective element in response to a control signal, and a control circuit for comparing a first optical signal of the selected wavelength band which has passed through the variable wavelength selective element with an identified wavelength band of the received optical signal and for detecting a phase difference between the first optical signal and the received optical signal using coherent detection and in response thereto generating the control signal to adjust the selected wavelength band of the variable wavelength selective element within a predetermined range of the identified wavelength band of the received optical signal.

28. A method of operating a variable dispersion optical unit comprising the steps of changing the relative dispersion between an input optical signal thereto and an output optical therefrom in response to a control signal, and performing coherent detection by beating the input optical signal and the output optical signal together to form the control signal to adjust the relative dispersion of the output optical signal to within a predetermined value of the dispersion of the input optical signal.

* * * * *